May 17, 1938.  M. SCHWARTZ  2,117,510
CAMERA ATTACHMENT
Filed April 3, 1935  3 Sheets-Sheet 1
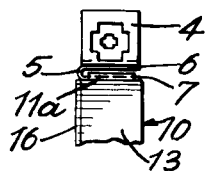
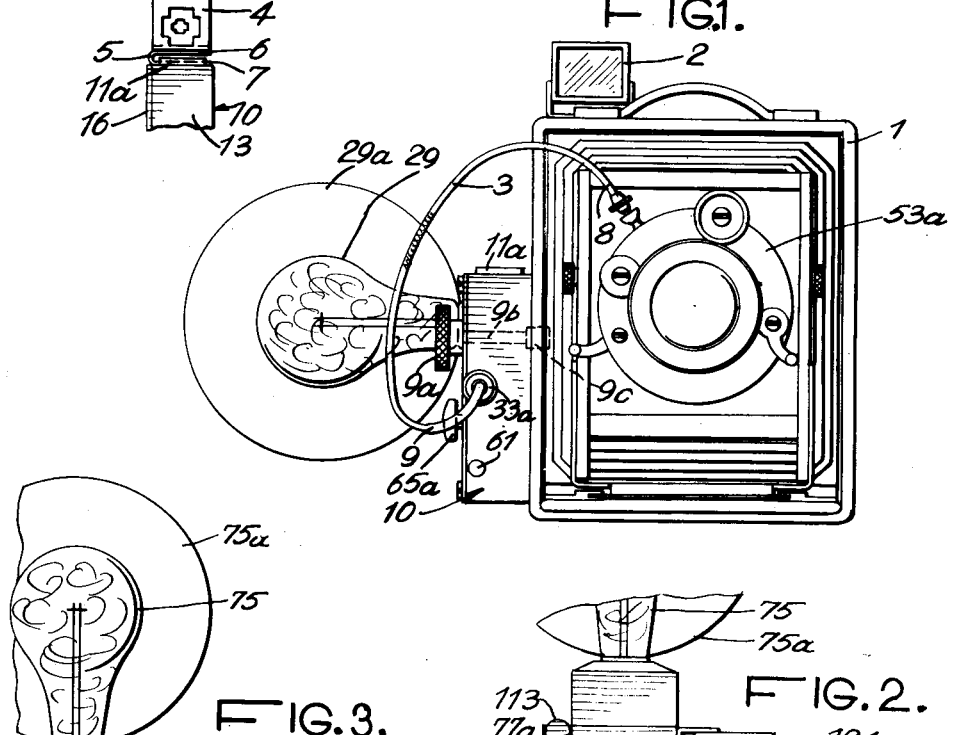
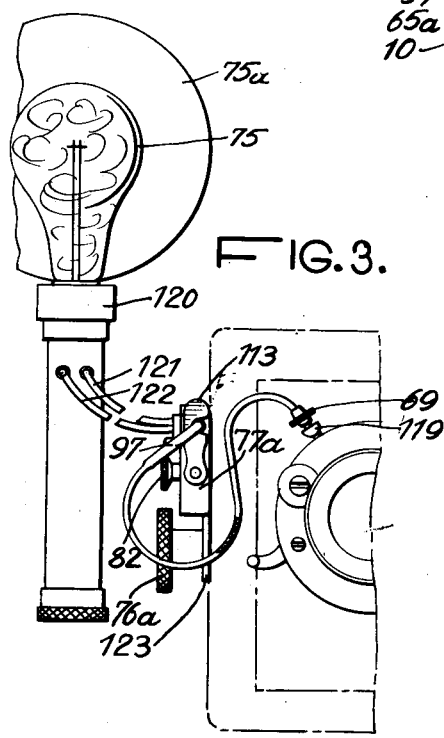
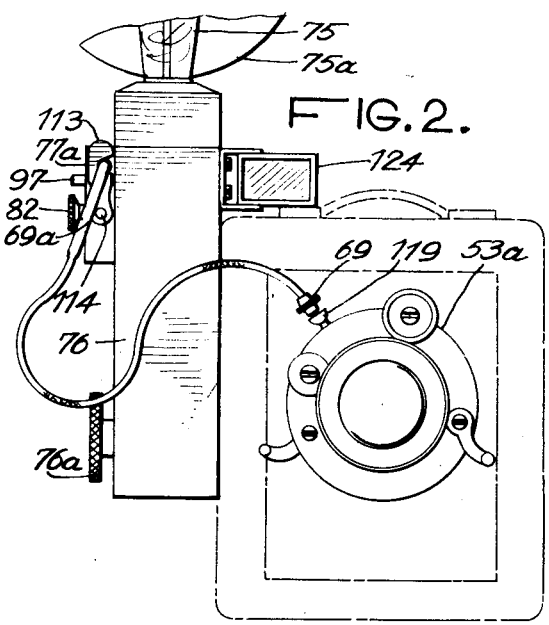
INVENTOR.
Morris Schwartz
BY Louis Casper
ATTORNEY.

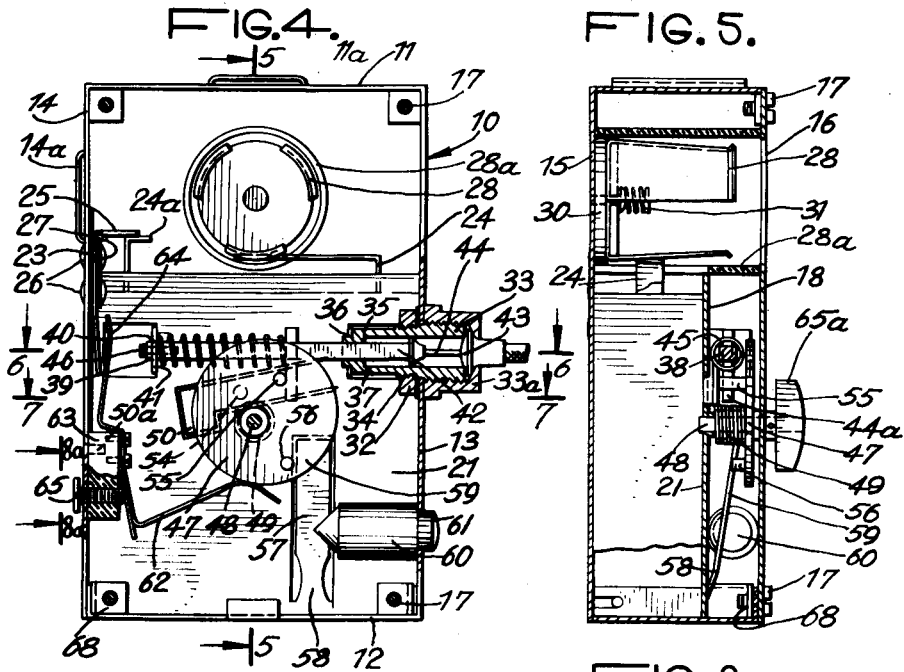
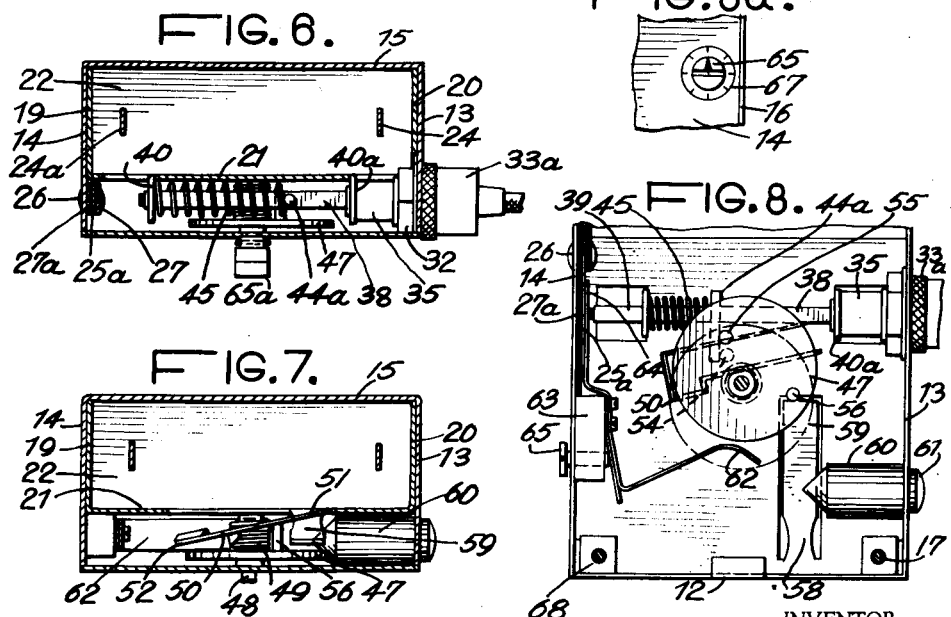
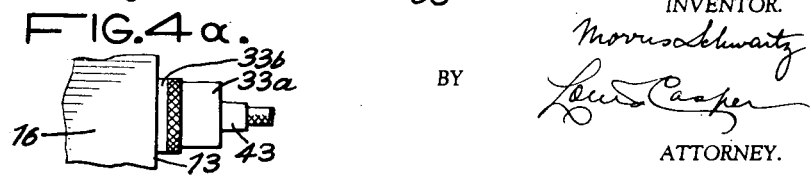

May 17, 1938. M. SCHWARTZ 2,117,510
CAMERA ATTACHMENT
Filed April 3, 1935 3 Sheets-Sheet 3
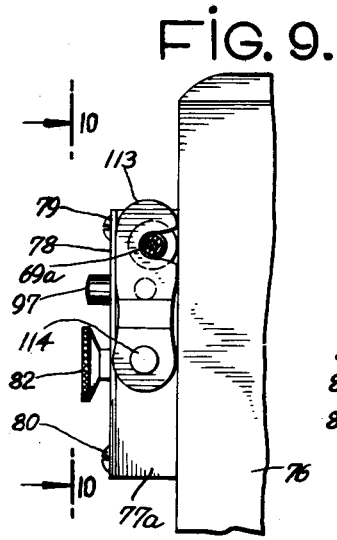
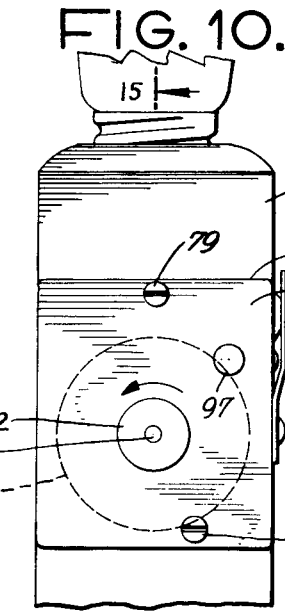
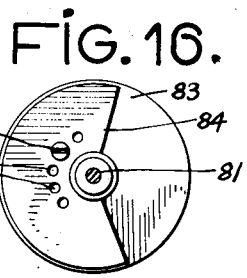
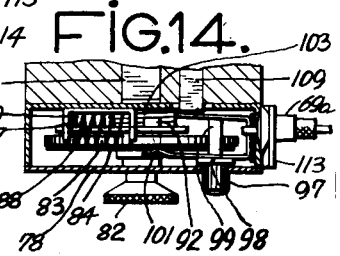
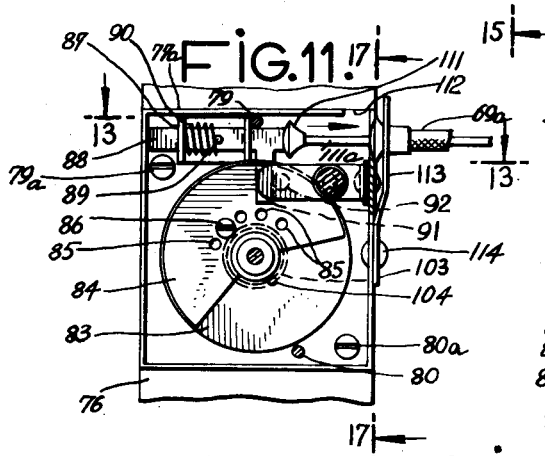
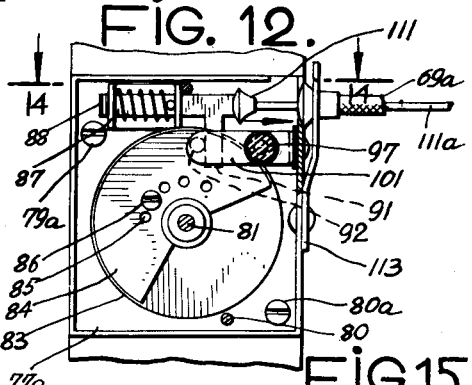
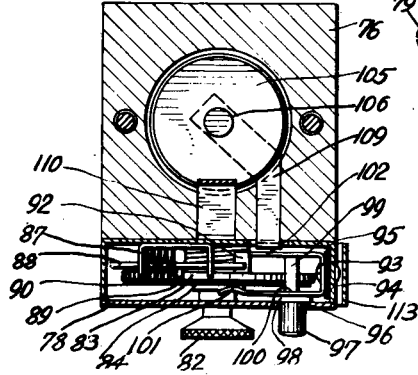
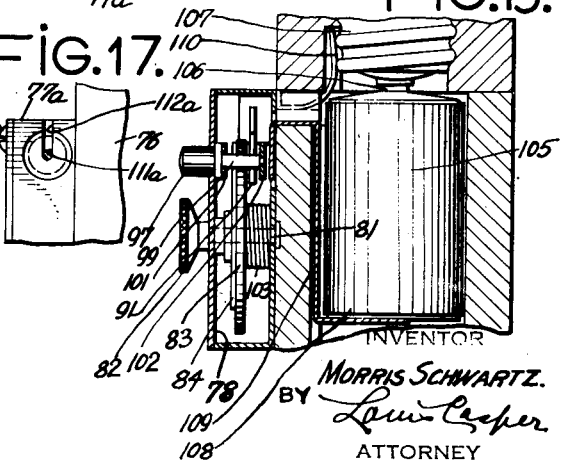
INVENTOR
MORRIS SCHWARTZ.
BY
ATTORNEY Patented May 17, 1938

2,117,510

UNITED STATES PATENT OFFICE 2,117,510

CAMERA ATTACHMENT

Morris Schwartz, Brooklyn, N. Y.

Application April 3, 1935, Serial No. 14,435

7 Claims. (Cl. 67—29)

My invention relates to a novel apparatus with which the operation of a camera shutter is synchronized with that of a flashlight means.

My invention is particularly adapted to be used in connection with a flash lamp constructed for use in connection with making flashlight pictures.

A further object of my invention is to provide an attachment to be mounted upon ordinary or standard types of cameras by which means both the camera shutter and the flashlight aforesaid may be synchronously operated.

This invention relates to and is in part a continuation of my copending application, Serial No. 730,879, filed June 16th, 1934.

As a further description of my invention, attention is directed to the accompanying drawings forming a part of this specification and in which—

Fig. 1 shows a camera with the synchronizer unit attached to one side of said camera.

Fig. 1a shows a manner of securing the finder to the synchronizer unit.

Fig. 2 illustrates a camera with a modified synchronizer unit attached to the side of said camera.

Fig. 3 shows another modification of a synchronizer unit attached to a camera with a casing in which is contained a battery and a flashlight operating in connection with said unit.

Fig. 4 shows in partial section an inside view of the synchronizer unit shown in Fig. 1 with the cover section of the container shell removed.

Fig. 4a shows a detail of a modified means of securing the camera shutter release to a synchronizer unit.

Fig. 5 illustrates a cross-section view of the synchronizer unit taken on a line 5—5 of Fig. 4.

Fig. 6 is a sectional view of the synchronizer unit taken on a line 6—6 of Fig. 4.

Fig. 7 is a sectional view of the synchronizer unit taken on a line 7—7 of Fig. 4.

Fig. 8 illustrates a position of the shutter operating mechanism in the unit proper.

Fig. 8a is a detail view of the adjusting screw mechanism taken on a line 8ª—8ª of Fig. 4.

Figs. 9 and 10 show a modification of the timing unit.

Fig. 11 shows a cross-sectional view of the modified timing unit shown in Fig. 10 before photographic exposure.

Fig. 12 is a similar view as shown in Fig. 11, but which shows the relation of the functioning parts after a photographic exposure.

Fig. 13 is a sectional view of the timing unit taken on a line 13—13 of Fig. 11.

Fig. 14 is a sectional plan view of the unit taken on a line 14—14 of Fig. 12.

Fig. 15 is a section through on a line 15—15 of Fig. 10.

Fig. 16 is a detail view showing the manner of adjustment for changing the time interval of the timing unit.

Fig. 17 is a part sectional view taken on a line 17—17 of Fig. 11 showing the manner of attaching the flexible cable release arrangement to the timing unit.

Referring to Fig. 4, the numeral 10 indicates a container or shell preferably of sheet metal having partition sections 11, 12, 13 and 14; also a rear plate section 15 (see Fig. 6) and a front cover plate 16 (Fig. 5), the latter being secured to the container 10 by means of the screws 17.

Inside the container or shell 10 is an inner enclosure 18 consisting of side sections 19, 20 and a front section 21 (see Fig. 6).

A battery 22 is held inside the container 10, said battery being fitted in the space provided between the side sections of the inner enclosure 18. The battery 22 (see Figs. 6 and 7) is provided with contact members 24 and 24ª. The member 24ª contacts with a contact spring 25 which is secured to the side section 14 of the container 10 by means of the rivets 26. The said contact spring is formed with an outward bend as shown in Fig. 4. The spring contact 25 is also insulated from the container or shell 10 by means of the insulation section 27.

The contact member 24 contacts with a socket 28 which receives the flashlight lamp 29. The socket 28 also receives the reflector 29ª. The socket 28 is insulated from the container or shell 10 by means of the insulated plate 30, the latter supporting a coiled contact spring 31 (see Fig. 5).

The side section 13 (Fig. 6) of the container or shell 10 is provided with a circular opening inside of which is affixed the threaded neck 33 the threaded section of which projects outwardly from the shell 10. There is screwed on to the threaded neck a ferrule 33ª said ferrule having a shoulder 33ᵇ, (see Fig. 4a). The said ferrule is provided with an opening of smaller diameter than the inner opening of said threaded neck 33. A nut 32 (Fig. 4) secures the neck 33 rigidly to side section 13. The neck 33 is provided with an inner section 35 the inside wall 37 of which is square shaped. At the entrance of said section 35 a shoulder 36 is provided, said shoulder having a square shaped opening. A square shaped plunger shaft 38 (Fig. 6) conforming in size to the opening of the shoulder 36 projects also through a square shaped opening 40 of a supporting bracket 41 (see Fig. 4). The opposite end section 42 of said plunger shaft 38 extends into the inside wall section 35 and said plunger contacts with the head of the plunger pin 44 of the cable release 43 (see Fig. 4). The circular metallic head of said cable release is affixed within the ferrule 33ª the outer opening thereof being smaller in diameter than the circular head of said cable release, said head is held within the inner area of said ferrule while the cable section of said cable release projects through the circular opening of said ferrule as shown in Fig. 4. The turning or screwing of said ferrule either clockwise or anticlockwise presses the plunger pin 44 either forward or backward thereby adjusting the flexible wire within said cable release causing said wire to project a certain length long or short distance beyond the tip end of said cable release because of the adjustment of the ferrule aforesaid. This adjustment is important, said cable adjustment affording means for tripping the shutter of various types of cameras to conform to the individual characteristics of said cameras, some requiring a longer length of projected cable release wire for said shutter tripping and some types requiring shorter cable release wire projection. A coiled spring 45 is held in tension between the pin 44ª (Fig. 6) and the supporting bracket member 41. An insulated contact 46 is also secured to the end section of the shaft 38 as shown.

An eccentric disc 47 is mounted on the front section of the inner enclosure 18 and which turns on a shaft 48. A coiled spring 49 has one end thereof secured to the disc 47 and the opposite end secured to the inner enclosure 18 (see Fig. 5). The spring aforesaid tends to keep the disc 47 under tension and substantially in the position shown in Fig. 4.

An extended L-shaped arm 50 is provided with an end section 51 which is secured to the inner enclosure 18. The opposite end section 52 of said L-shaped arm is free (see Fig. 7).

A pin 54 (Fig. 8) is secured to the L-shaped member 50. Pins 55 and 56 are secured to the eccentric ring 47. Another extruded arm 57 is provided having one end section 58 secured to the inner section 18 and the opposite end section 59 thereof being free.

The function of this arm will hereinafter be described.

A Bakelite push button 60 is inserted through an opening 61 of the side section 13.

A contact spring 62 is held by means of screws to a Bakelite block 63. The said spring has an extended section 64 (see Fig. 8). The block 63 is rigidly mounted to the side section 14 and is provided with a contact adjusting screw 65.

A screw 50ª (Fig. 4) secures the insulated block 63 to the side section 14. A turning handle 65ª is provided for setting the device back to the position preparatory to exposing and flashing a picture. This position is shown in Fig. 8.

The shell 28ª is of insulated material and surrounds the lamp socket 28 as shown in Fig. 4.

The stop pin 44ª is provided for the plunger shaft 38 as stated.

An insulated plate 27ª is provided for insulating the spring contact 25ª.

53ª is the camera lens as shown in Figs. 1 and 2.

67 is a time setting scale for the adjusting screw 65. (See Fig. 8a.)

68 is a reinforcement support for the cover fastening 17.

Referring to Figs. 1 and 1a, the numeral 1 represents the camera proper having a finder glass 2. The cable release 3 is secured to the camera shutter 53ª by means of the cup screw 8 and said cable release is connected at its opposite end 9 to the shell 10 of the synchronizer unit and through the bushing 33ª which is set into the shell of the unit aforesaid as shown in Fig. 1.

The camera 1 is also provided with the usual finding glass 2. A focusing and objective scanning device 4 is shown in Fig. 1a having a U-shaped bracket 5, one side thereof secured to the finding device 4 and the opposite side thereof 7 affixed into the slot 11ª of the unit 10.

A plate 6 is used as a reinforcement between the device 4 and the U-shaped bracket 5 (see Fig. 1a). A battery is contained within the synchronizer unit shell 10.

Referring specifically to Figs. 9 and 10. Fig. 9 shows a side view of a modification of a timing unit. Fig. 10 is the front view thereof. The function of the unit shown in the foregoing figures is similar to that shown in Figs. 4 and 5. The construction is somewhat simplified which enables such a unit to be preferably used by amateurs.

The numeral 77ª designates preferably a square shaped casing of the modified timing unit. This casing has an opening at the front thereof, said opening being covered by a flat square cover 78, said cover being held in place by the screws 79, 80.

One end of the shaft 81 projects through the casing 77ª and which has a knurled turning screw 82.

A disc 83 is attached to the shaft 81 as shown in Fig. 15. The disc is partially insulated by means of cut-off section 84 upon which are provided 5 circular apertures 85. A screw 86 secures the insulated cut-off section 84 to the disc 83.

The function of the apertures aforesaid will be hereinafter explained.

The upper section of the casing 77ª has a U-shaped member 87 (Fig. 14) secured to it. The U-shaped member aforesaid carries a plunger bar 88 which is slidably mounted therein. The plunger bar 88 is provided with a stop pin 89 and a push spring 90. The spring aforesaid maintains the plunger bar 88 at a tension in the direction indicated by the arrow shown in Figs. 11 and 12.

The plunger bar 88 is provided with a trip finger 91 which contacts with a pin 92, the latter being secured to the disc 84. The contacting of the trip finger 91 and the pin 92 retains the plunger bar 88 in the position shown in Fig. 11.

A U-shaped member 93 is secured to the side portion 94 of the casing 77ª. The member 93 is insulated from the casing 77ª by means of the insulated plate 95. The cover 78 has a circular opening 96 into which there is placed a push button 97 made of insulated material and which has a stop collar 98 and an inner projection 99 which projects through an opening 100 situated at the side designated as 101 of the U-shaped member 93. The tip of the projection 99 contacts with the opposite side designated as 102 of the U-shaped member 93.

The disc 83 is maintained at a tension by means of the spiral spring 103. One end, designated as 104 (Fig. 11) of the spring aforesaid is secured to the disc 83, the opposite terminal of the spring being attached to the casing 77ª.

The casing 77ª forms a part of an electrical circuit which includes the flashlight, the latter being connected thereto through the medium of the member 110 (see Fig. 15).

To adjust the timing of the modified unit, the screw 86 is first loosened off the disc 83. The insulated disc is then turned to a point where the screw is in line with one of the apertures 85 and the screw 86 is screwed therein.

In Fig. 16 there are shown five apertures which will allow for five adjustments for timing. It will be observed in this figure that the timing adjustment is different from that shown in Fig. 11.

When the operator desires to make a picture, he presses the button 97. This causes the stop collar 98 of the button 97 to press against section 101 of the U-shaped member 93 which in turn presses against the disc 83. The opposite side 102 of the U-shaped member contacts at the same time with the member 109 when the aforesaid section 102 goes off the pin 92.

The pin 92 being secured to the disc 83 leaves the latter free to rotate in a clockwise direction under tension of the spring 103.

The member 101 contacts with the surface of the disc 83 and, inasmuch as the face of the disc 83 is partially insulated and partially metallic, an electric contact is made with the member 101 during the revolution of the disc aforesaid; and, upon completion of this revolution the trip finger 91 of the bar 88 is made free to move in the direction shown by the arrow in Fig. 11 and to operate the flexible cable release which in turn operates the camera shutter.

The timing adjustment previously set by adjusting the relative positions of the metallic disc 83 with the insulated disc 84, times the closing of an electric circuit which includes the following elements: The casing 77ª, spring member 110, flash light 107, battery 105, contact member 109, spring 102, spring 101 and the disc 83.

The disc 83 is electrically connected to the casing 77ª by means of the spring 103.

When the operator desires to set the modified unit in preparation for another film exposure, he turns the knurled knob 82 in an anti-clockwise direction which restores the mechanism to its original position as shown in Figs. 11 and 13.

The synchronizer unit as described possesses two outstanding advantages. It is small and easily attached so that the camera can be carried closed. The act of attaching and detaching said unit does not interfere with the time adjustment. Furthermore, the battery serves only to flash the lamp and is not instrumental in operating the synchronizer, hence the timing is in no way affected by the condition of the battery other than the effect upon the flash lamp itself.

Referring to Figs. 4 and 8, the former figure illustrates the synchronizing unit in an unoperative position or after a picture had been exposed. After the end section 9 of the cable release 3 is secured inside the bushing 33, the restoring handle 65ª is turned anti-clockwise. This movement causes the pin 55 to contact with the pin 44ª of the plunger shaft 39 and in the position shown in Fig. 8 and is thus held preparatory to being set off for an exposure of a picture.

The end section 64 of the contact spring 62 is pressed against the end section 25ª of the spring 25 by means of the insulated contact 46. This action places the aforementioned springs in electrical connection. The pin 56 contacts with the spring arm 59 and serves to hold the eccentric disc 47 in the position shown in Fig. 8.

When the operator wishes to photograph an object he presses the Bakelite button 60 which in turn depresses the spring 59 inwardly. (See Fig. 5.)

The operation aforesaid releases the pin 56 and the eccentric disc 47 respectively. This disc being under tension of the coiled spring 49 revolves in a clockwise direction.

At a predetermined part of the revolution of the disc 47, the pin 55 depresses the L-shaped arm 50 which releases the pin 44ª and with it the square shaped plunger shaft 38. The plunger shaft being held under tension of spring 45, moves in a forward direction and operates the shutter release. At the same time the eccentric disc 47 contacts with the contact spring 62 and thereby closing an electric circuit that includes disc 47, shaft 48, container shell 10, contact spring 31, flashlight 29, socket 28, battery contact 23, contact spring 25 and contact spring 62.

After the exposure has been made, the parts are restored to the position shown in Fig. 8, which as already stated is accomplished by turning the knob 65 in an anti-clockwise direction.

Referring again to Fig. 1, the unit 10 is secured to the camera 1 by means of the knurled screw 9ª having a shank 9ᵇ the end section 9ᶜ thereof being enlarged and is seated into the frame of the camera aforesaid.

Mounted to said unit is the flashlamp bulb assembly 29 having a reflector 29ª. The flashlamp assembly being virtually mounted on the unit in the manner shown, enables the operator to better focus and concentrate the flash upon the object to be photographed. In this connection the operator is assisted by the scanning device 4 which is normally mounted into the bracket 11ª of said unit. The battery in connection with the flashlamp is contained in the unit as shown in Fig. 6.

In this manner the finder lens, the timing unit, the scanning device and the flash lamp are all concentrated at one side of the camera thus enabling the operator to have an unhampered view of the object to be photographed and complete control of the camera shutter movement and the flashing of the lamp aforesaid by reason of the arrangement as described.

Referring to Fig. 2 which is a similar but modified arrangement to that shown in Fig. 1. In this figure the combination battery case and flashlamp bulb holder 76 is attached to one side of the camera by means of set screw 76ª.

The finder lens 124 is secured to said battery case to the left and top of the camera 1 in the manner shown in said figure. The unit 77ª is also secured to the battery case 76. A cable release 9 is secured at one end to the camera shutter 53ª by means of the thumb screw 69 which is screwed into the cup screw socket 119 that is secured to the camera shutter aforesaid. The opposite end of the cable release 9 is secured to the bushing 69ª which is exteriorly supported by the spring bracket 113 that is secured to the unit 77ª by means of rivet 114.

In Fig. 3 the battery case 120 and flash lamp 75 together with the reflector 75ª attached thereto form a separate unit and are joined electrically by means of the wires 121 and 122 which extend through the casing of the timing unit. The timing unit 77ª is directly attached to the camera body 19 by means of an extension ear 123.

It will thus be seen that a novel and practical synchronizing unit for flashing of pictures has been devised and one that is well adapted for high speed exposures, having particular novelty in timing and securing synchronous sequence of operation.

Now having described my invention, what I claim is—

1. In a camera having a camera shutter, a battery container having a battery therein mounted on said camera, said mounting effected through the medium of a hand turning screw projecting through said container and into said camera, a flash lamp socket to contain a flash lamp mounted on said container; a flash light and camera shutter releasing unit attached to said container; a plunger rod in said unit for actuating said camera shutter through the medium of a cable release between said unit and said camera shutter, a spring for actuating said plunger; a turning knob for winding said spring; and push button means on said unit for causing the release of said plunger rod simultaneously with the release of means contained in said unit for causing the flashing of the flash lamp aforesaid.

2. In combination, a camera, a synchronizer unit, manually operable releasing means within said unit that causes the tripping of the shutter of said camera and the set off of a flash lamp synchronously; a battery included in a circuit, said manually operable releasing means also included in said circuit, said flash lamp also included in said circuit, a combination container containing said battery and a flash lamp mounting, said synchronizer unit attached to said container, said container adjustably attached to said camera; a cable release connected between said synchronizer unit and said camera shutter, said cable release forming the connecting medium for tripping said camera shutter by said operable releasing means in said synchronizer unit synchronously with the set off of the flash lamp aforesaid.

3. The structure as set forth in claim 2 and a viewing finder attached to said container in the manner and for the purpose as set forth.

4. In combination, a camera, a synchronizer unit adjustably attached thereto a battery contained within said unit, a push button or the like for releasing means within said unit for tripping the shutter of said camera synchronously with the set off of a flash lamp, a flash lamp mounting connected to said synchronizer unit, a cable release connected between said synchronizer unit and said camera shutter, said cable release forming the operatively connecting medium to trip said camera shutter by said push button synchronously with the set off of said flash lamp; and scanning means mounted on the synchronizer unit aforesaid.

5. In combination, a synchronizer unit having means therein to cause the set off of a flash lamp synchronously with the tripping of a shutter of a camera, said set off means of said synchronizer unit including a battery and said flash lamp contained in said unit, said synchronizer unit adjustably connected to said camera, said set off means in said synchronizer unit also including a cable release between said unit and said camera shutter, said synchronizer unit having outer and visible means for adjusting the length of the outward projection of the flexible wire contained in said cable release whereby said wire projection may be adjusted to conform to the shutter tripping requirement with respect to extent of projection of said flexible wire from the tip end of the cable release aforesaid.

6. In combination, a synchronizer unit having means therein to cause the set off of a flash lamp synchronously with the tripping of a shutter of a camera, said set off means of said synchronizer unit including a battery and said flash lamp, a casing in which said battery and said flash lamp are contained, said synchronizer unit connected to said casing, said casing adjustably connected to said camera; said set off means in said synchronizer unit also including a cable release connected between said synchronizer unit and said camera shutter, said synchronizer unit having means for adjusting the length of the outward projection of the flexible wire contained within said cable release whereby said wire projection from the tip end therefrom may be adjusted to conform to the tripping requirement of the shutter of a camera to which said combined synchronizer unit and said casing is applied.

7. In combination, a synchronizer unit for a camera having an eccentrically mounted disc, an adjustable resilient contact spring bearing upon the periphery of said disc, a push button to release said disc, a spring pressed plunger that is set off in turn by said disc, said disc having an alternate electrical contacting and an insulation area, said electrical contacting area cooperating with said resilient contact spring, a battery in circuit connection with said contact spring, a flash lamp in circuit connection with said battery, said release of said disc causing the contact of said electrical contacts and the release of said spring pressed plunger, the release of said plunger causing the tripping of said camera shutter through the medium of a cable release situated between said plunger and said camera shutter; and knob resetting means to restore said disc and said plunger to the normal setting position with one continuous winding preparatory to the exposure of a new picture.

MORRIS SCHWARTZ.